United States Patent Office 3,497,362
Patented Feb. 24, 1970

3,497,362
TREATMENT OF VEGETABLES
André Patron, Vevey, and Klaus Schreckling, La Tour-de-Peilz, Switzerland, assignors to Maggi-Unternehmungen A.G., Kempttal, Switzerland, a Swiss company
No Drawing. Filed Feb. 7, 1966, Ser. No. 525,361
Claims priority, application Switzerland, Feb. 12, 1965, 1,975/65
Int. Cl. A23b 7/14
U.S. Cl. 99—204                                                 11 Claims

ABSTRACT OF THE DISCLOSURE

A process for retarding oxidation in vegetables. The vegetables are immersed in an aqueous antioxidant comprising an extract of an aromatic plant of the Labiatae family which has been partially solubilized in a molecularly dehydrated phosphate. The contacted vegetables are then dehydrated.

---

The present invention is concerned with the preservation of vegetables.

Vegetables, such as carrots, potatoes, spinach, leeks, beans and celery, are generally preserved by dehydration, the vegetables usually being reduced to slices, cubes, strips or flakes. Upon a more or less extended period of storage, the vegetables tend to alter in colour and flavour and, in extreme cases, become unfit for human consumption.

Such alterations in flavour and appearance are most frequently caused by oxidation of different substances present in the vegetables and hence, it has become standard practice in the food industry to treat dried vegetables with various antioxidants the most common of which is sulphur dioxide. Other antioxidants which are also employed are phenolic substances such as BHA (butyl hydroxy anisole), BHT (butyl hydroxy toluene), NDGA (nordihydroguiaretic acid) and DPPD (propyl gallate).

Although in a number of cases the use of antioxidants gives satisfactory results, their use is in many ways restricted. For example, vegetables which are in small pieces such as cubes, slices or strips have a large surface area which has to be treated and consequently large quantities of antioxidant have to be used to ensure thorough penetration. When sulphur dioxide is used, a high dosage leads to a concentration in the final product which is above the taste threshold and the vegetable acquires an unpleasant flavour. Furthermore, the use of artificial antioxidants is strictly governed by food legislations and in some countries is totally prohibited.

The present invention provides a process for the preparation of dehydrated vegetables which comprises the step of contacting said vegetables with an aqueous antioxidant composition containing, as active ingredients, at least 0.010% by weight of an extract of an aromatic plant of the Labiatae family and 0.1 to 1.0% by weight of a molecularly dehydrated phosphate containing at least one P—O—P linkage in its molecule and having the empirical formula

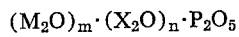
$$(M_2O)_m \cdot (X_2O)_n \cdot P_2O_5$$

(in which M represents an alkali metal atom, X represents a hydrogen or alkali metal atom, $1 \leq m \leq 2$, $0 \leq n \leq 1$ and $m+n \leq 2$).

Molecularly dehydrated phosphates are sometimes referred to as polyphosphates and the P—O—P linkage is one of their characteristic features. These substances may exist in polymeric forms.

According to the present invention, it is preferred to employ the phosphate in anhydrous form. Examples of suitable phosphates are tetrasodium pyrophosphate, disodium dihydrogen pyrophosphate, sodium hexametaphosphate and sodium trimetaphosphate. Commercial grades of phosphates are usually mixtures of different substances, but this does not present any disadvantages with respect to the process of the present invention.

The extract of an aromatic plant of the Labiatae family may for example be prepared from rosemary, sage, origanum, thyme or marjoram. This extract may be obtained by conventional extraction of the selected plant, which is preferably rosemary or sage, with an organic solvent such as methanol, ethanol or petroleum ether. The plant is advantageously extracted in dry, preferably ground, condition. It is also possible to prepare the extract from the residues which are obtained in the preparation of essential oils by distillation of the plants. When the extraction has been completed, the solvent may be eliminated and the extract is obtained in powdered form which is substantially odourless.

The aromatic plant extract is itself insoluble in water but it is solubilized to a certain extent by the phosphate. In practising the invention, the extract may first be dissolved in a solvent therefor, such as methanol, ethanol or acetic acid and this solution may be added in appropriate quantities to an aqueous solution of the phosphate to provide a bath in which the vegetables are then dipped. In this manner, the extract precipitates in the aqueous solution as a very fine suspension. Ethanol is the preferred solvent for dispersing the extract.

As previously indicated, the aqueous antioxidant composition contains at least 0.010% of aromatic plant extract. The upper limit will generally be fixed having regard to the storage period desired for the vegetables. On the other hand, since the extract may still possess a faint odour, the quantity employed should desirably be such that its presence remains imperceptible. In general, extract concentrations in the composition of 0.015 to 0.025% give very satisfactory results, that is, the treated vegetables are still acceptable after 9 months storage under normal atmospheric conditions.

The duration of treatment with the composition will depend on the vegetable and its state of subdivision, and can be determined by simple test. For vegetables in small pieces, such as potatoes in the form of strips about 30 to 35 mm. long and 3 x 6 mm. in cross-section, a treatment time of 2 to 5 minutes is satisfactory. For larger pieces, longer times, up to 10 minutes, should be sufficient. Although it is preferable to effect the treatment of the vegetable at a temperature of 40 to 60° C., in general temperatures between 0 and 80° C. are satisfactory.

In accordance with the present invention, it is preferred to effect the contacting of the vegetable with the aqueous antioxidant composition before the vegetable is subjected to any blanching treatment. This is a somewhat surprising observation for in general it is usual practice to treat vegetables with an antioxidant immediately before final drying. It would appear that in the treatment according to the invention the antioxidant acts immediately on the vegetable enzyme and protects the tissues from the action of occluded oxygen. An explanation of this phenomenon may be found in the observation that the plant extract is insoluble in water and does not volatilise in steam.

The treated vegetables may be precooked as desired and dried by conventional methods, such as air drying or freeze-drying. Alternatively, the vegetables, especially potatoes, may be partially (40–60% moisture) or more or less completely dried (10–15% moisture) after precooking and then fried in a suitable fat. The fried vegetable preferably has a moisture content of 4 to 6%.

The treatment according to the invention may be employed in the dehydration of a large variety of vegetables, and especially carrots, potatoes, spinch, green beans and celery.

The following examples are given by way of illustration only.

EXAMPLE 1

Preparation of aromatic plant extract 60 g. of dried ground rosemary, from which the essential oil has been removed by distillation, are extracted for 8 hours in a Soxhlet apparatus with 250 ml. of 95% ethanol. After separation of the solid matter, about 200 cc. of alcoholic extract, which is greenish-brown in colour, are obtained. The extract contains 7 to 8 g. of solids, which represents a yield of 10 to 12%.

Extracts of other aromatic plants of the Labiatae may be prepared in similar manner.

EXAMPLE 2

Carrots are peeled, washed and machine-cut into 8 mm. cubes. A bath is prepared containing, per 10 litres of water, 40 g. of crystalline neutral sodium pyrophosphate and 50 ml. of alcoholic rosemary extract containing 40 g. dry matter per litre. The bath is warmed to 50° C. The cubed carrots are dipped in the bath for 3 minutes and drained. 10 litres of bath are used for 1500 g. of carrot cubes. The cubes are then blanched for 5 minutes in steam at 98° C. and cooled by a water spray during 30 seconds. The carrots are then freeze-dried to a final moisture content of about 1%. A control sample is also prepared under conditions which are identical except that the antioxidant treatment is omitted. After 4 months' storage at 37° C. in air, the control sample is completely discoloured and has an unpleasant sharp flavour which renders it unfit for consumption whereas the product which has been treated with the antioxidant still has the normal orange colour and typical carrot odour and flavour.

EXAMPLE 3

Celery is treated as described in Example 2 except that 10 litres of bath are used for treating 2500 g. of celery cubes. An untreated control sample is also prepared. After 6 months' storage in air at 37° C., the celery cubes which were treated with antioxidant have a characteristic celery flavour and odour and are perfectly edible whereas the control sample has a rancid odour when dry and upon reconstitution the flavour is unrecognisable and even unpleasant.

EXAMPLE 4

Spinach is tailed, washed in color water, drained and cut into pieces 2 to 5 cm. square. These pieces are dipped in a bath containing, per litre of water, 10 cc. of alcoholic rosemary extract prepared as described in Example 1 and 4 g. of crystalline tetrasodium pyrophosphate. The bath temperature is 50–55° C. and the residence time of the pieces is 4 minutes. After draining the pieces are blanched and dried in air to a final moisture content of 3–4%. A control sample is prepared in the same manner, but the antioxidant treatment is omitted. After 3 weeks' storage in air at 20° C., the control sample has an odour of hay whereas the treated sample has retained a pleasant aroma and flavour.

EXAMPLE 5

Potatoes are washed, peeled, sorted and cut up into strips about 30–35 mm. long and 3 x 6 mm. in cross-section. These strips are washed in cold water to remove surface starch and are dipped for about 2–4 minutes in a bath containing, per litre of water, 3–4 cc. of rosemary extract prepared as described in Example 1 except that the powder is dissolved in acetic acid, and 4 g. of tetrasodium pyrophosphate. The bath temperature is 55° C. and the residence time of the strips about 3 minutes. Thereafter the strips are blanched or precooked in steam at atmospheric pressure and are then dried to a final moisture content of 3–5%. After 9 months' storage in air at room temperature the appearance, odour and flavour of the product are unchanged.

EXAMPLE 6

Washed, peeled and sorted potatoes are cut into thin chips or slices. The pieces are washed in water and dipped for 2.5–3.5 minutes in a bath containing, per litre of water, 2.7 g. of tetrasodium pyrophosphate ($Na_4P_2O_7$) and 4.5 cc. of alcoholic rosemary extract prepared as described in Example 1. The bath temperature is 55° C.; however, it may vary from 45 to 60° C.

The treated potato pieces are blanched or precooked in steam for 4 minutes, sprinkled with water and predried in hot air (60–85° C.) to a moisture content of 50%. The predried product is left to equilibrate in a closed chamber for 4 hours and is then fried for 2 minutes in groundnut oil at 180–200° C. The final moisture content of the fried potatoes is 4–6%.

EXAMPLE 7

The procedure described in Example 6 is repeated except that the potato pieces are pre-dried to a moisture content of 10–15%. The moisture content is allowed to equilibrate over several hours and the pieces are fried in groundnut oil during 20–25 seconds at 180–200° C. The final product has a moisture content of 4 to 6%.

EXAMPLE 8

The procedure described in Example 5 is repeated except that the rosemary extract was replaced by an equal quantity of an extract of sage. After 6 months' storage in air at 30° C. the odour and flavour of the product were still good.

We claim:

1. In a process for the preparation of dehydrated vegetables, the steps which comprise contacting said vegetables with an aqueous antioxidant composition containing, as active ingredients, at least 0.010% by weight of an extract of an aromatic plant of the Labiatae family and 0.1 to 1.0% by weight of a molecularly dehydrated phosphate containing at least one P—O—P linkage in its molecule and having the empirical formula $$(M_2O)_m \cdot (X_2O)_n \cdot P_2O_5$$

(in which M represents an alkali metal atom, X represents a hydrogen or alkali metal atom, $1 \leq m \leq 2$, $0 \leq n \leq 1$ and $m+n \leq 2$), said phosphate ingredient partially solubilizing said extract in the aqueous medium, and dehydrating said vegetables after contact with said composition.

2. A process according to claim 1 in which the vegetables are blanched or precooked after said contacting.

3. A process according to claim 1 in which said aromatic plant is rosemary, sage, origanum, marjoram or thyme.

4. A process according to claim 1 in which the duration of said contacting does not exceed 10 minutes.

5. A process according to claim 1 in which said contacting is effected at a temperature of 40 to 60° C.

6. A process according to claim 1 in which the vegetable is one of the following, namely potatoes, spinach, carrots, green beans and celery.

7. A process according to claim 1 in which the vegetable is potato which is pre-dried and fried after said contacting.

8. In a process for the preparation of dehydrated vegetables, the steps which comprise contacting said vegetables with an aqueous antioxidant composition containing as active ingredients at least 0.010% by weight of an extract of an aromatic plant of the Labiatae family, said extract being obtained by extracting said aromatic plant with a lower alkyl alcohol, together with 0.1 to 1.0% by weight of a molecularly dehydrated phosphate containing at least one P—O—P linkage in its molecule and having the empirical formula $$(M_2O)_m \cdot (X_2O)_n \cdot P_2O_5$$

(in which M represents an alkali metal atom, X represents a hydrogen or alkali metal atom, $1 \leq m \leq 2$, $0 \leq n \leq 1$ and $m+n \leq 2$), and dehydrating said vegetables after contact with said composition.

9. In a process for the preparation of dehydrated vegetables, the steps which comprise contacting said vegetables with an aqueous antioxidant composition containing as active ingredients at least 0.010% by weight of an extract of an aromatic plant of the Labiatae family, said extract being obtained by extracting said aromatic plant with methanol, together with 0.1 to 1.0% by weight of a molecularly dehydrated phosphate containing at least one P—O—P linkage in its molecule and having the empirical formula $$(M_2O)_m \cdot (X_2O)_n \cdot P_2O_5$$

(in which M represents an alkali metal atom, X represents a hydrogen or alkali metal atom, $1 \leq m \leq 2$, $0 \leq n \leq 1$ and $m+n \leq 2$), and dehydrating said vegetables after contact with said composition.

10. In a process for the preparation of dehydrated vegetables, the steps which comprise contacting said vegetables with an aqueous antioxidant composition containing as active ingredients at least 0.010% by weight of an extract of an aromatic plant of the Labiatae family, said extract being obtained by extracting said aromatic plant with ethanol, together with 0.1 to 1.0% by weight of a molecularly dehydrated phosphate containing at least one P—O—P linkage in its molecule and having the empirical formula $$(M_2O)_m \cdot (X_2O)_n \cdot P_2O_5$$

(in which M represents an alkali metal atom, X represents a hydrogen or alkali metal atom, $1 \leq m \leq 2$, $0 \leq n \leq 1$ and $m+n \leq 2$), and dehydrating said vegetables after contact with said composition.

11. In a process for the preparation of dehydrated vegetables, the steps which comprise contacting said vegetables with an aqueous antioxidant composition containing as active ingredients at least 0.010% by weight of an extract of an aromatic plant of the Labiatae family, said extract being obtained by extracting said aromatic plant with petroleum ether, together with 0.1 to 1.0% by weight of a molecularly dehydrated phosphate containing at least one P—O—P linkage in its molecule and having the empirical formula $$(M_2O)_m \cdot (X_2O)_n \cdot P_2O_5$$

(in which M represents an alkali metal atom, X represents a hydrogen or alkali metal atom, $1 \leq m \leq 2$, $0 \leq n \leq 1$ and $m+n \leq 2$), and dehydrating said vegetables after contact with said composition.

References Cited

UNITED STATES PATENTS

| | | | |
|---|---|---|---|
| 2,509,719 | 5/1950 | Birdseye | 99—204 |
| 2,571,948 | 10/1951 | Sair et al. | 99—140 |
| 2,629,664 | 2/1953 | Watts et al. | 99—163 |
| 3,109,739 | 11/1963 | Hilton | 99—100 |

A. LOUIS MONACELL, Primary Examiner

S. B. DAVIS, Assistant Examiner

U.S. Cl. X.R.

99—154, 207